US006347031B1

(12) United States Patent
Kawamoto

(10) Patent No.: US 6,347,031 B1
(45) Date of Patent: Feb. 12, 2002

(54) EARTHING CLIP TERMINAL

(75) Inventor: Hideo Kawamoto, Kanagawa (JP)

(73) Assignee: J.S.T. Mfg. Co., LTD, Osaka (JP)

( * ) Notice: Subject to any disclaimer, the term of this patent is extended or adjusted under 35 U.S.C. 154(b) by 0 days.

(21) Appl. No.: 09/524,283

(22) Filed: Mar. 13, 2000

(30) Foreign Application Priority Data

Mar. 17, 1999 (JP) .......................................... 11-072149
Oct. 6, 1999 (JP) .......................................... 11-285659

(51) Int. Cl.[7] .................................................. H02H 1/00
(52) U.S. Cl. ...................................... 361/212; 361/220
(58) Field of Search ................................ 361/212, 220; 439/845, 849, 852, 862, 270

(56) References Cited

U.S. PATENT DOCUMENTS 4,306,761 A 12/1981 Ress, Jr. ..................... 439/862
4,566,747 A 1/1986 Peers ......................... 439/270
5,601,458 A 2/1997 Oshumi et al. ............. 439/852
D434,375 S 11/2000 Kawamoto ................. D13/133

FOREIGN PATENT DOCUMENTS

JP UM7-22471 4/1995
JP UM8-6366 2/1996

*Primary Examiner*—Michael J. Sherry
(74) *Attorney, Agent, or Firm*—Rader, Fishman & Grauer, PLLC

(57) ABSTRACT

A snap-on type earthing clip terminal clamps a mounting plate on opposite first and second faces thereof while engaging an engaging claw in a through hole of the mounting plate. The terminal possesses a terminal body to which an electric wire is connected. A primary pressure strip is formed by cutting and bending up a portion of the terminal body excluding an auxiliary pressure strip with the engaging claw. A pressing portion of the primary pressure strip resiliently presses the first face of the mounting plate in an insertion space. Consequently, the terminal body and the auxiliary pressure strip closely contact the second face of the mounting plate.

9 Claims, 8 Drawing Sheets

EARTHING CLIP TERMINAL

CROSS REFERENCE TO RELATED APPLICATION

This application claims the benefit under 35 U.S.C. §119 of Japanese Unexamined Patent Publication Nos. 11-72149 and 11-285659 (1999), the abstracts of disclosure of which are incorporated herein by reference.

BACKGROUND OF THE INVENTION

1. Field of the Invention

The present invention relates to an earthing clip terminal and an earthing structure including the same which are used for discharging static electricity from home appliances and OA appliances, for example.

2. Description of Related Arts

There has been known an earthing terminal which is secured to a mounting plate by means of a fixing screw through a mounting hole of the mounting plate. This terminal, however, requires the screw which increases costs. Additionally, the assembly work is cumbersome, involving an operation for mounting the terminal using a screwdriver.

An alternative earthing terminal has been proposed which is easily mounted to place in a snap by passing a mushroom-shaped hook thereof through the mounting hole of the mounting plate (see, for example, Japanese Unexamined Utility Model Publication No.7-022471 laid open on Apr. 21, 1995).

This earthing terminal is arranged such that the hook is passed through the mounting hole and then expanded on a back side of the mounting plate for unremovably lock the terminal to the mounting plate.

Once mounted, the earthing terminal is generally left as it is. However, there may be a case where the mounted terminal need be removed and then mounted again. Unfortunately, the earthing terminal of the above official gazette cannot be removed in the first place.

On the other hand, as shown in FIG. 8A, an earthing clip terminal 52 has been proposed which permits a snap-on mounting by clamping an end of a mounting plate 51 on both sides thereof (see, for example, Japanese Unexamined Utility Model Publication No.8-6366 laid open on Feb. 21, 1996).

The clip terminal 52 is arranged as follows. The clip terminal 52 is mounted to the end of the mounting plate 51 by inserting the end of the mounting plate 51 between its terminal body 53 and its pressure strip 54 (clip piece) formed by cutting and bending up a portion of the terminal body. In this state, the clip terminal fixes itself to place by clamping the mounting plate 51 between the terminal body 53 and the pressure strip 54 and by locking an locking claw 55 formed at a free end of the pressure strip 54 in a through hole 56 of the mounting plate 51.

Since the pressure strip 54 has the locking claw 55, the clip terminal 52 cannot release the engagement between the locking claw 55 and the through hole 56 of the mounting plate 51 unless a gap between the pressure strip 54 and the terminal body 53 is expanded wide by using an edge portion 57 of the mounting plate 51, as shown in FIG. 8B. Hence, a great load is applied to a proximal end 58, or a root portion of the pressure strip 54, in particular, tending to cause plastic deformation thereof. If the clip terminal 52 is once removed from the mounting plate 51 and then mounted again, the pressure strip 54 and the terminal body 53 fail to present a sufficient clamping force so that a reliable earthing connection may not be accomplished.

Assuming a case where the clip terminal 52 of this type is mounted to the mounting plate 51 without the through hole 56, the clip terminal is held onto the mounting plate only by a frictional force presented by the locking claw 55 pressing a corresponding surface of the mounting plate 51. This results in another problem that the clip terminal suffers an insufficient retaining force.

SUMMARY OF THE INVENTION

In view of the foregoing, an object of the invention is to provide a snap-on type earthing clip terminal which is capable of ensuring the reliable ear-thing connection if a need should arise for re-mounting the terminal.

According to a preferred aspect of the invention for achieving the above object, a snap-on type earthing clip terminal clamping a mounting plate on opposite first and second faces thereof, comprises: a plate-like terminal body to which an electric wire is connected; a locking claw which is formed by cutting and bending up a portion of the terminal body and is locked to the mounting plate; and a primary pressure strip which is formed by cutting and bending up a portion of the terminal body exclusive of an auxiliary cantilever pressure strip with the locking claw and which is cantilevered from the terminal body. The mounting plate is inserted between the primary pressure strip and the terminal body and between the primary pressure strip and the auxiliary pressure strip. The primary pressure strip includes a pressing portion which resiliently presses the first face of the inserted mounting plate thereby bringing the terminal body and the auxiliary pressure strip into close contact with the second face of the mounting plate.

In this aspect, the primary pressure strip and the auxiliary pressure strip are separately disposed on the opposite sides of the mounting plate and hence, a great formation of the primary pressure strip is not needed for releasing the engaged locking claw during the removal of the clip terminal. As a result, the plastic formation of the primary pressure strip is prevented. Thus, even if the terminal is once removed from the mounting plate and mounted thereto again, the reliable earthing connection is ensured.

DETAILED DESCRIPTION OF THE PREFERRED EMBODIMENTS

Figure 1A:
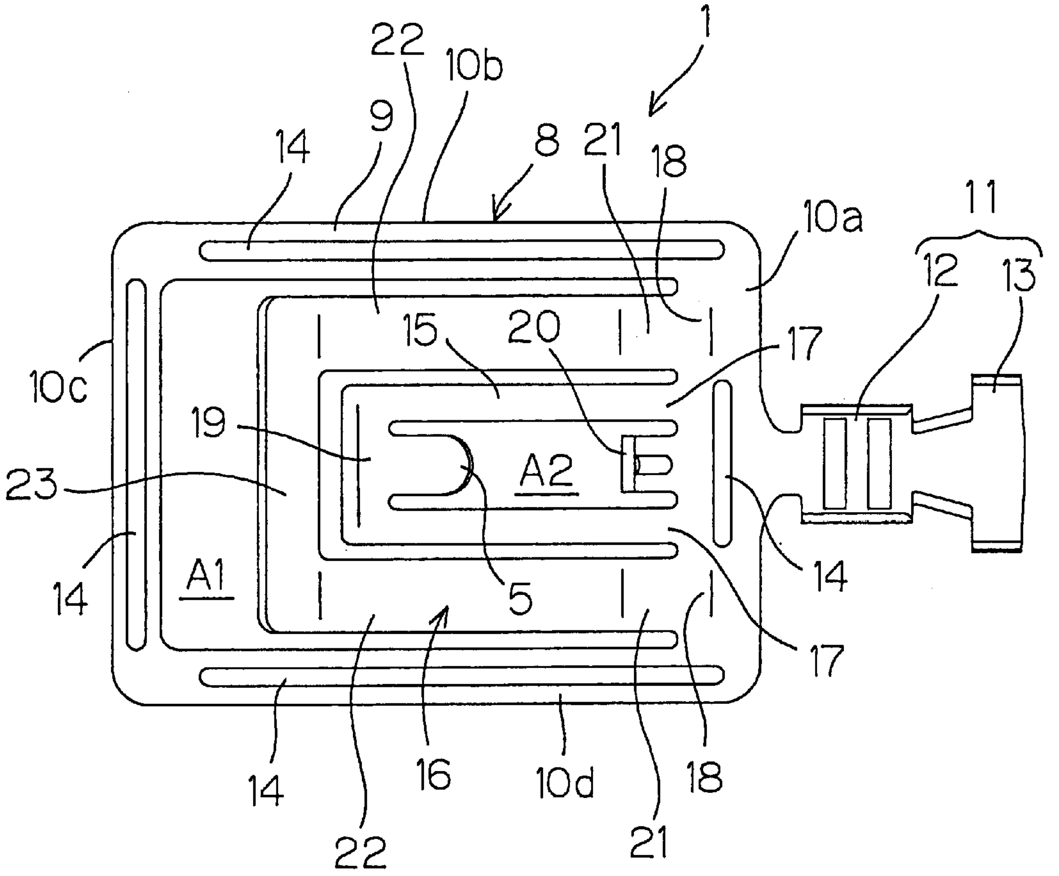
FIGS. 1A and 1B are a top plan view and a side view or showing an earthing clip terminal according to one embodiment of the invention.
Figure 1B:
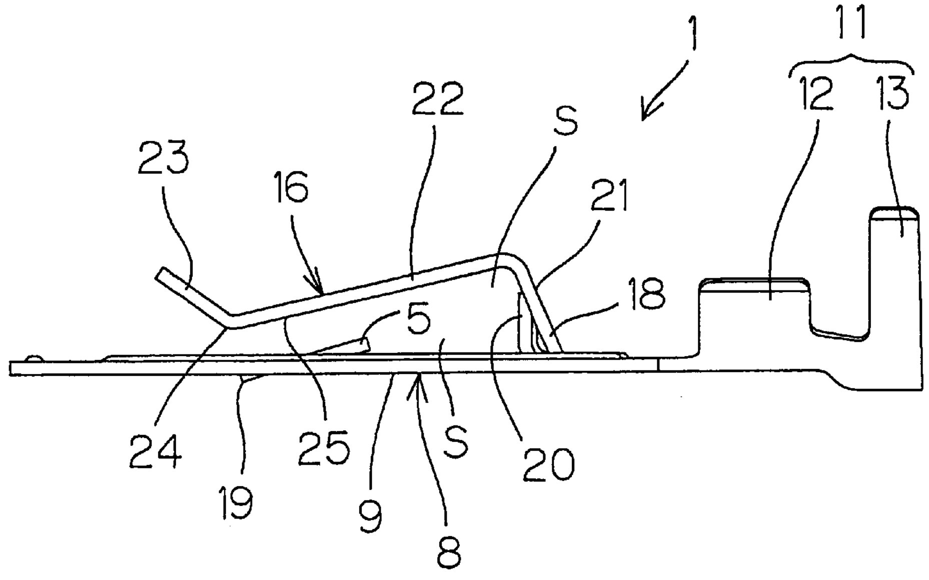
Figure 2A:
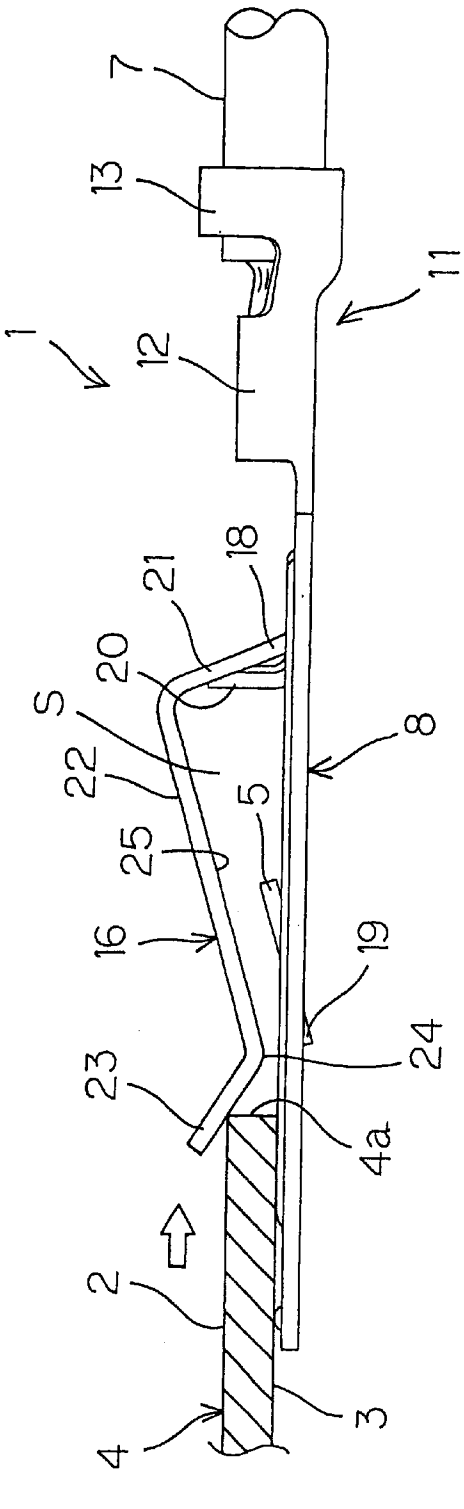
FIGS. 2A and 2B are sectional views of an earthing structure for illustrating sequential steps of mounting the terminal to a mounting plate.
Figure 2B:
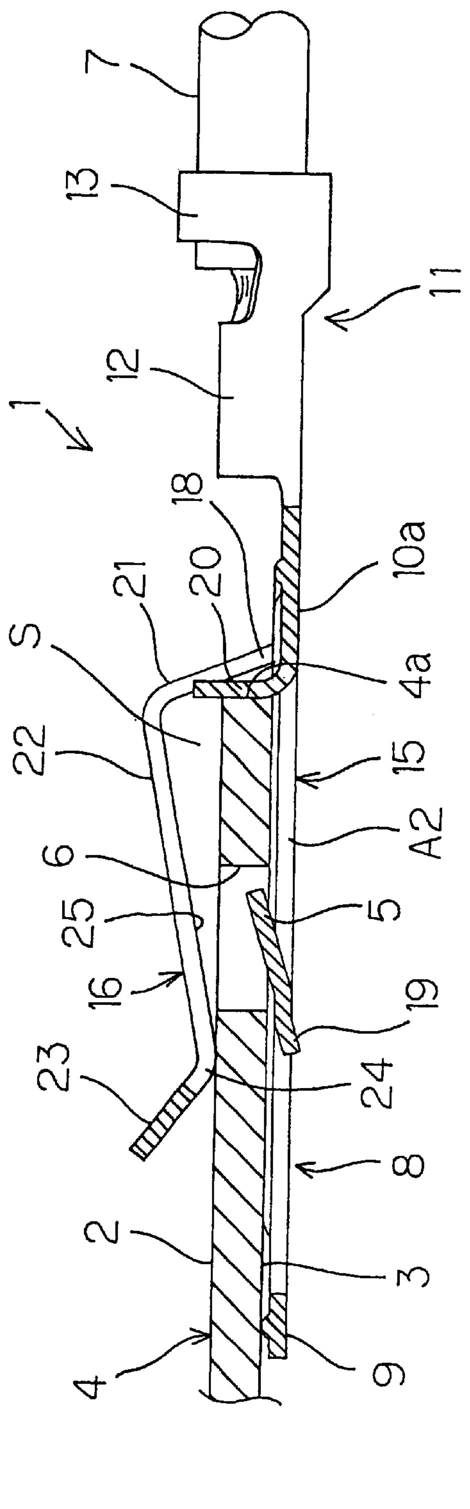

Now, preferred embodiments of the invention will be described with reference to the accompanying drawings. FIGS. 1A–1B are a top plan view and a side view for showing an earthing clip terminal according to a first embodiment hereof. FIGS. 2A–2B are sectional views of an earthing structure for illustrating sequential steps of mounting the earthing clip terminal to a mounting plate. Referring to FIG. 2B, an earthing clip terminal 1 (hereinafter, simply referred to as "terminal 1") is of a type which clamps a mounting plate 4 on opposite first and second faces 2, 3 thereof as locking its locking claw 5 as an engaging claw in a through hole 6 of the mounting plate 4.

As seen in FIG. 1A, the terminal 1 includes a plate-like terminal body 8 to which an electric wire 7 is connected. The terminal body 8 includes a square annular portion 9 possessing edges 10*a*, 10*b*, 10*c* and 10*d*, and a wire connector portion 11 orthogonally extending from a midportion of the edge 10*a* of the annular portion 9. The wire connector portion 11 includes a wire barrel 12 and an insulation barrel 13 which are crimped onto a conductor and an insulation portion of the electric wire 7, respectively. Indicated at 14 are hollow ribs (beads) disposed at the respective edges of the annular portion 9 for reinforcement.

Within an area A1 of the terminal body 8, a primary pressure strip 16 is formed by cutting and bending up a portion of the terminal body exclusive of an auxiliary cantilever pressure strip 15 with the locking claw 5. The primary pressure strip 16 is shaped like a gate and supported by the edge 10*a* of the terminal body 8 in a cantilever fashion.

The auxiliary pressure strip 15 defines a gate shape on a plane common with the terminal body 8 and extends from the edge 10*a* of the annular portion 9 in the opposite direction to the wire connector portion 11. A pair of proximal ends 17, 17 of the auxiliary pressure strip 15 are located between a pair of proximal ends 18, 18 of the primary pressure strip 16. As shown in FIGS. 1B and 2B, an insertion space S for receiving an end of the mounting plate 4 is defined between the primary pressure strip 16 and the terminal body 8.

As shown in FIG. 1A, the locking claw 5 is formed by cutting and bending, extending into an area A2 inside of the gate-shaped portion from an edge of a distal end 19 of the auxiliary pressure strip 15. The locking claw 5 has its edge projected into the insertion space S, as shown in FIG. 1B. As seen in FIG. 2B, the locking claw 5 inclines at a small angle relative to the auxiliary pressure strip 15 and is substantially in parallel relation with an inclined guide surface 25 of the primary pressure strip 16, which will be described hereinlater.

As shown in FIGS. 1A and 2B, a stopper 20 of an L shape in section is formed by cutting and bending, and extends from the edge 10*a* between the proximal end pair 17, 17 of the auxiliary pressure strip 15 into the area A2 inside of the gate shape of the auxiliary pressure strip 15.

As shown in FIGS. 1A, 2A and 2B, the primary pressure strip 16 of the gate shape as seen in plan has a substantially cranked shape in section. The primary pressure strip 16 includes an inclined first segment 21 continuous to the edge 10*a* of the annular portion 9 of the terminal body 8 via the proximal ends 18, a second segment 22 continuous to the first segment 21 and inclined in reverse direction thereto, and a third segment 23 continuous to the second segment 22 and inclined in reverse direction thereto.

When an edge portion 4*a* of the mounting plate 4 is inserted in the insertion space S between the terminal body 8 and the primary pressure strip 16, the third segment 23 abuts against the edge portion 4*a* for guiding the same. A pressing portion 24 is defined by a crest formed on a boundary between the second segment 22 and the third segment 23. The pressing portion 24 resiliently presses the first face 2 of the mounting plate 4 inserted between the primary pressure strip 16 and the terminal body 8 and between the primary pressure strip 16 and the auxiliary pressure strip 15, thereby bringing the terminal body 8 and the auxiliary pressure strip 15 into being approximately along the second face 3 of the mounting plate 4. If the mounting plate 4 is inserted with the second face 3 thereof in close contact with the terminal body 8 and the auxiliary pressure strip 15, the locking claw 5 is locked in the through hole 6 of the mounting plate 4, as shown in FIG. 2B, for preventing the terminal 1 from slipping off from the mounting plate 4. Briefly, a simple insertion of the mounting plate accomplishes the mounting of the terminal in a snap.

Figure 8A:
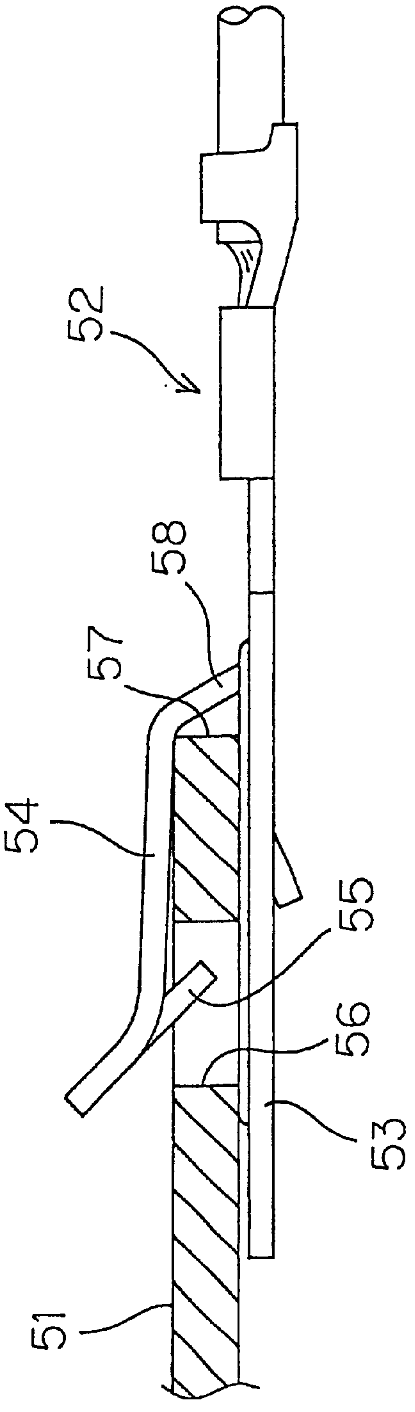
FIG. 8A PRIOR ART
FIGS. 8A and 8B are sectional views of a prior-art earthing structure for illustrating a state of the mounted terminal and a step of removing the terminal.
Figure 8B:
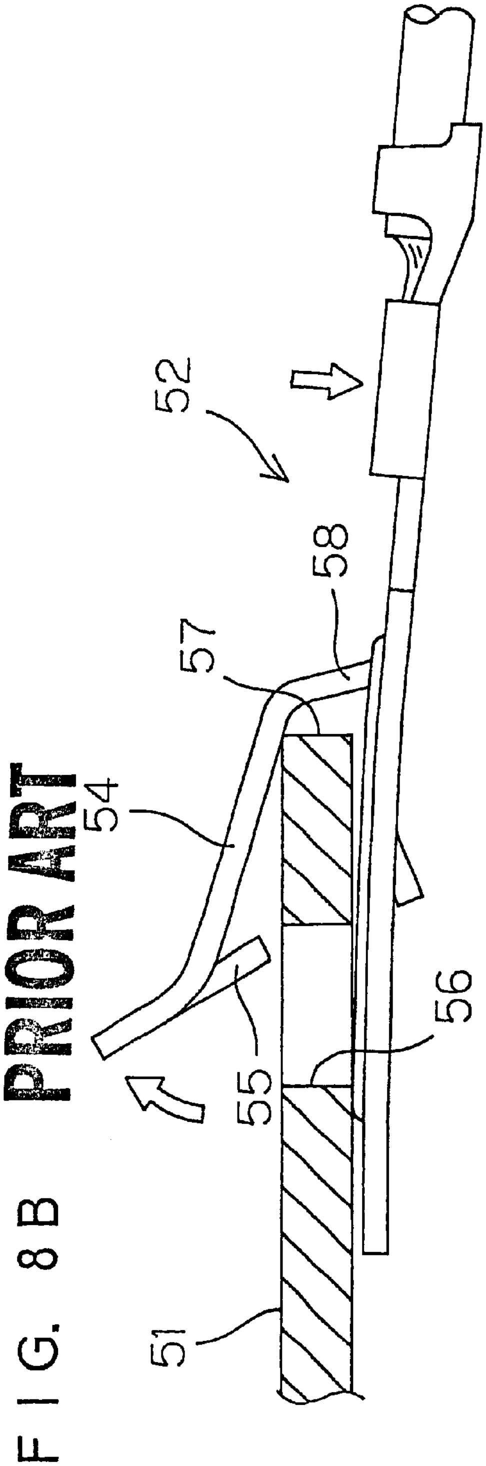
FIG. 8B PRIOR ART

Since the primary pressure strip 16 and the locking claw 5 are separately disposed on the opposite sides of the mounting plate 4, the deformation of the primary pressure strip 16 in the removal of the terminal is much less than the prior-art structure of FIGS. 8A–8B wherein the primary pressure strip is formed with the locking claw. Even if the once removed terminal 1 is re-mounted to the mounting plate 4, a reliable earthing connection can be accomplished.

The stopper 20 abuts against the edge portion 4*a* of the mounting plate 4 inserted in the insertion space S, thereby preventing the edge portion 4*a* from abutting against a proximal end 18 of the primary pressure strip 16. Therefore, the proximal end 18 of the primary pressure strip 16 is not subject to an unwanted great load so that the plastic deformation of the primary pressure strip 16 is reliably avoided. This further increases the possibility of the reliable earthing connection by the re-mounted terminal.

Figure 3:
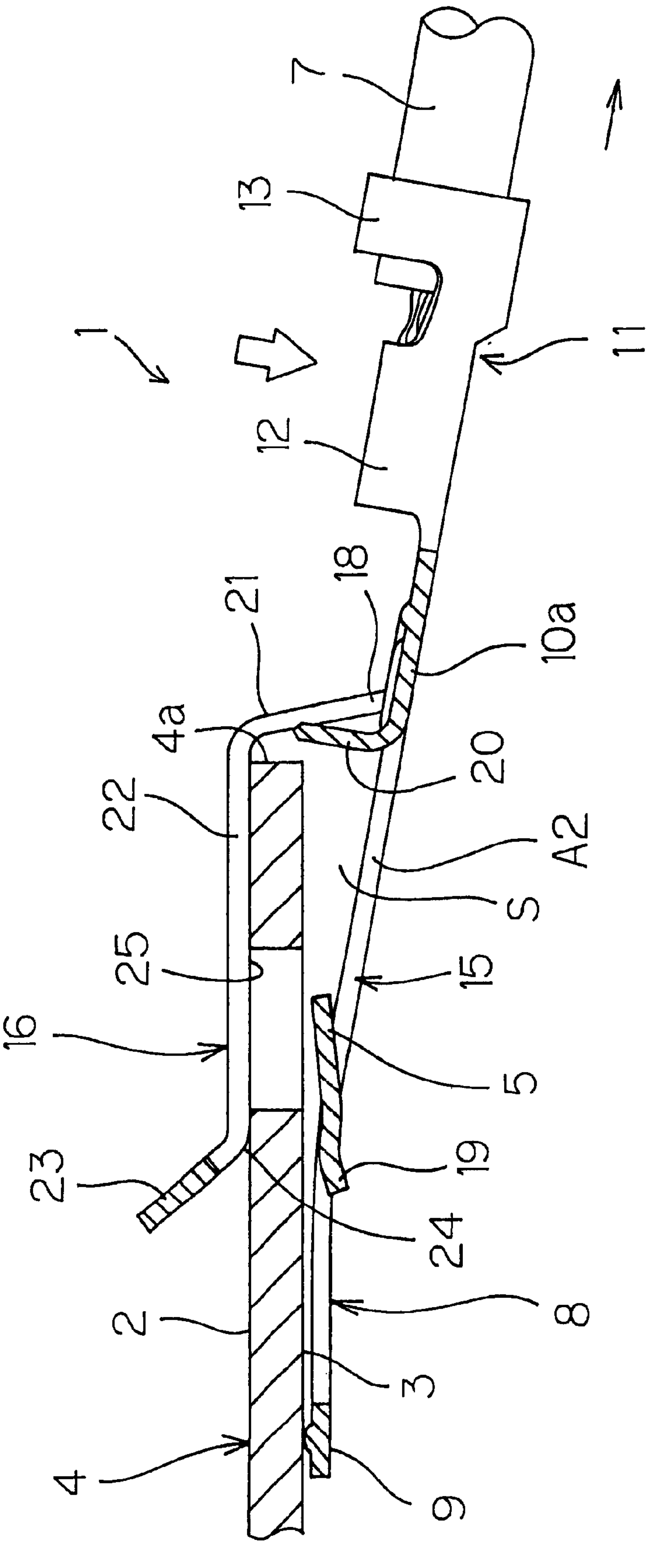
FIG. 3 is a sectional view showing the earthing structure when the terminal is removed from the mounting plate.

On the other hand, a surface of the second segment 22 opposite to the first face 2 of the mounting plate 4 inserted into the insertion space S defines the inclined guide surface 25. The guide surface serves to guide movement for removal when some need arises for removing the terminal 1 from the mounting plate 4. Specifically, in the removal of the terminal 1, a force indicated by a blank arrow of FIG. 3 is applied to the wire connector portion 11 so that an angular relation of the terminal 1 with the mounting plate 4 is changed to bring the inclined guide surface 25 into being approximately along the first face 2 of the mounting plate 4.

The arrangement is made such that the mounting plate 4 is positioned out of interference with the locking claw 5 by bringing the first face 2 thereof into being approximately along the inclined guide surface 25. In this position, the mounting plate 4 is relatively slid on the inclined guide surface 25 so as to permit the terminal 1 to be removed therefrom easily and smoothly. In addition, the amount of deformation of the primary pressure strip 16 is limited by bringing the mounting plate 4 into being approximately along the inclined guide surface 25. This also instantaneously makes an operator aware of a proper angle for the removal. Therefore, the primary pressure strip 16 is prevented from being deformed more than needed. In this sense, the plastic deformation of the primary pressure strip 16 is reliably avoided.

Figure 4:
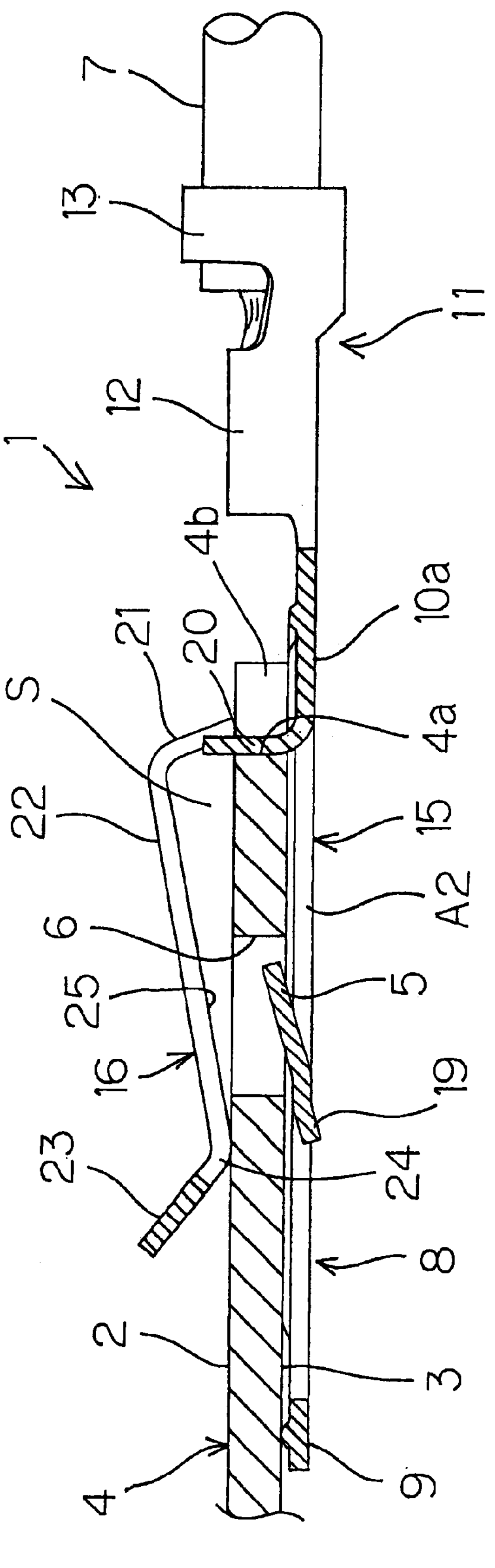
FIG. 4 is a side view showing an earthing clip terminal according to another embodiment of the invention.

It is to be noted that the invention is not limited to the foregoing embodiment. As shown in FIG. 4, for example, the stopper 20 of the earthing clip terminal 1 may be designed to fit in a recess 4*b* formed in the edge portion 4*a* of the mounting plate 4. This arrangement achieves a rigid fixing relation with reduced free play of the terminal 1 relative to the mounting plate 4. Incidentally, the other parts of the embodiment of FIG. 4 are the same as those of the embodiment of FIG. 2 and are respectively represented by the same reference characters, the description of which is dispensed with.

Even if the embodiment of FIG. 1 omits the stopper, the re-mounting of the terminal ensures the reliable earthing connection by virtue of the primary pressure strip 16 and the locking claw 5 which are separately disposed on the opposite sides of the mounting plate 4.

As another approach, the prior-art arrangement of FIGS. 8A–8B may be modified such that the terminal body 53 is provided with the stopper abutting against an edge portion 57 of the mounting plate 51 thereby to prevent the plastic deformation of the primary pressure strip.

Figure 5:
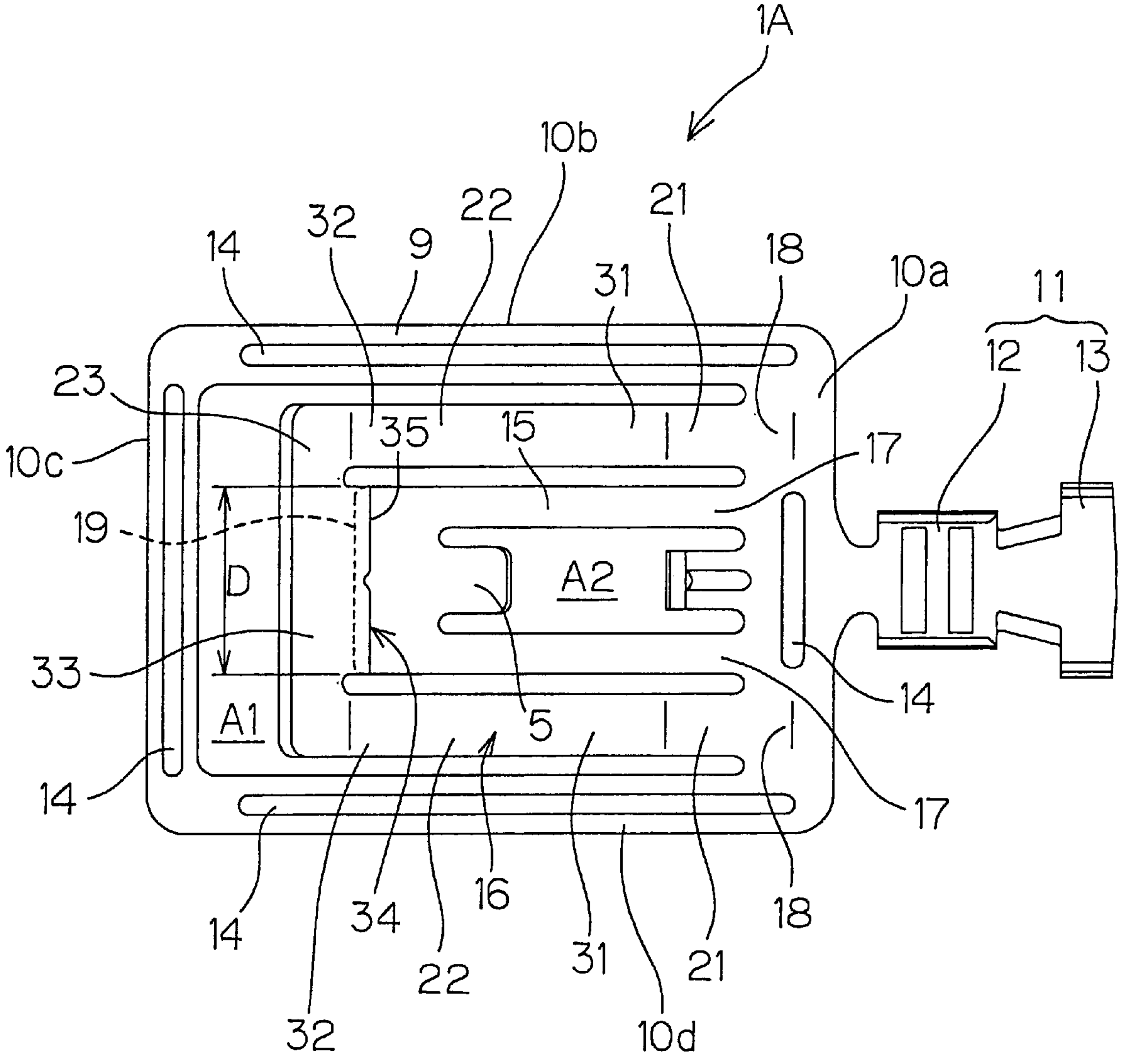
FIG. 5 is a top plan view showing an earthing clip terminal according to yet another embodiment of the invention.

Next, an earthing clip terminal 1A according to another embodiment of the invention is shown in FIG. 5. As seen in FIG. 5, the primary pressure strip 16 presents a gate shape by interconnecting respective ends 32 of a pair of side pieces 31 with a connector piece 33, the side pieces extending from the pair of proximal ends 18, 18, respectively. Each side piece 31 includes the first segment 21 and the second segment 22 whereas the connector piece 33 corresponds to the third segment 23. This embodiment resembles the embodiment of FIG. 1 in this respect but differs therefrom in that the connector piece 33, corresponding to the third segment 23, is formed with a wide claw piece 34 extending into an area inside of the gate shape of the primary pressure strip 16.

An edge portion 35 of the claw piece 34 defines the pressing portion pressed against the first face of the mounting plate 4. A width D of the claw piece 34 is greater than a diameter of the through hole 6. The other parts are the same as those of the embodiment of FIG. 1 and hence, are respectively represented by the same reference characters, the description of which is dispensed with.

Although not illustrated, the earthing clip terminal 1A of this embodiment can present the same working effect as the embodiment of FIG. 1 when the terminal 1A is mounted to the mounting plate 4 with the through hole 6 as shown in FIG. 3. The claw piece 34 providing the pressing portion has the width D greater than the diameter of the through hole 6 and therefore, the earthing clip terminal 1A is not caught in the through hole 6 when the terminal is removed.

Figure 6:
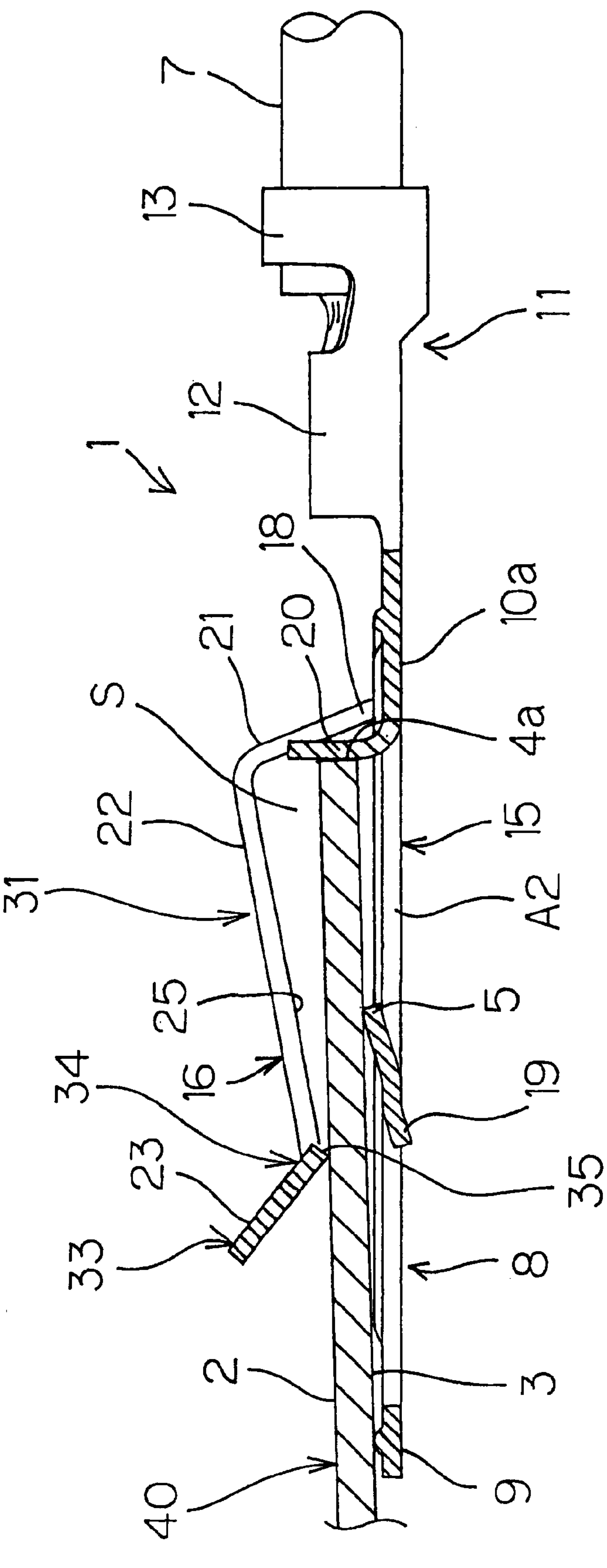
FIG. 6 is a sectional view showing a state wherein the earthing clip terminal of FIG. 5 is mounted to a mounting plate without a through hole.

On the other hand, in a case where the earthing clip terminal 1A is mounted to the mounting plate 4 without the through hole, as shown in FIG. 6, an edge of the locking claw 5 and the edge portion 35 of the claw piece 34, as the pressing portion, respectively press the corresponding faces 2, 3 of the mounting plate 4 at increased surface pressure so as to present a high frictional force against the removing of the mounting plate. As a result, the earthing clip terminal 1A can achieve such a high retaining force for the mounting plate that the terminal can be used regardless of whether the mounting plate has the through hole 6 or not. Hence, a wider application of the earthing clip terminal 1A results.

Figure 7:
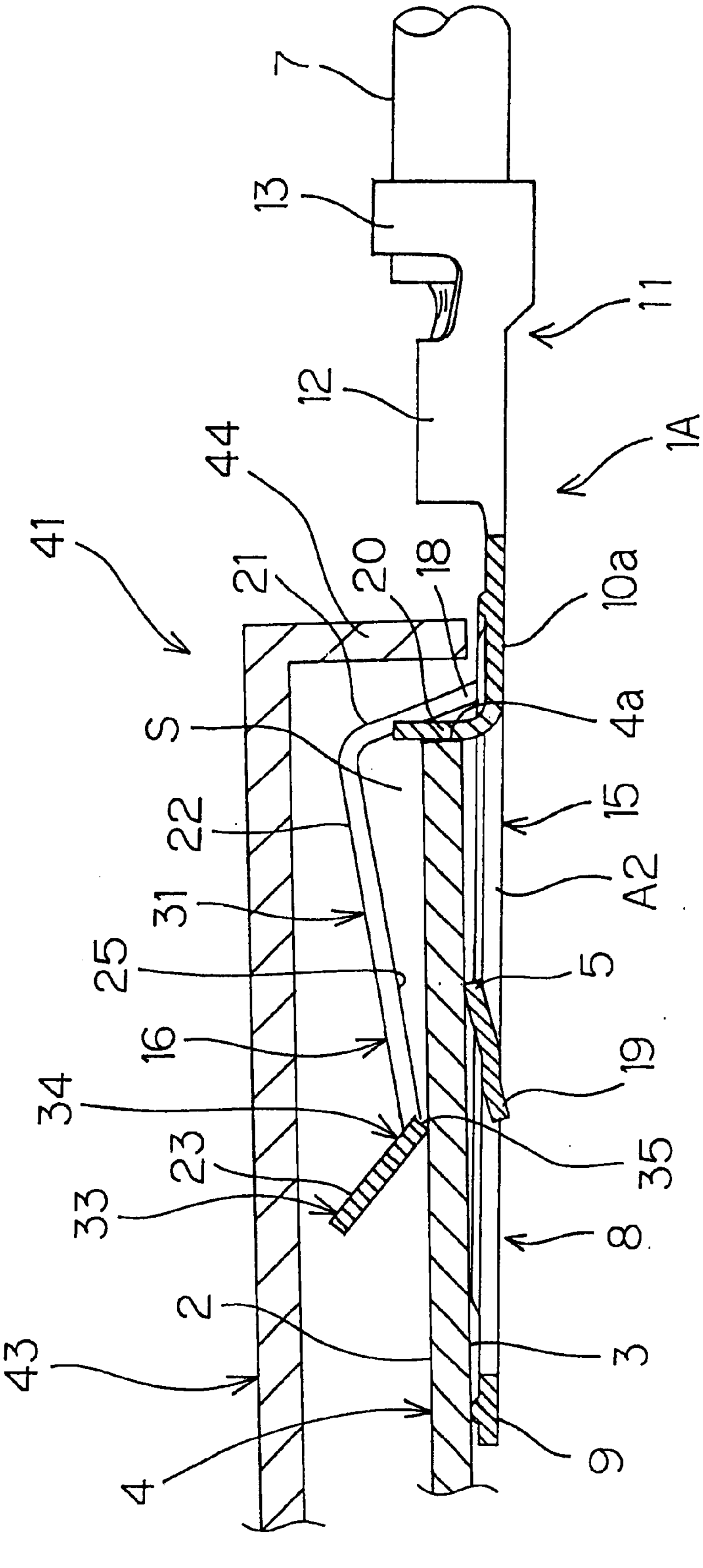
FIG. 7 is a sectional view showing an exemplary earthing structure with the earthing clip terminal of FIG. 5 mounted to a board, wherein slip off of the terminal from the board is prevented by a chassis covering the board as disposed in parallel thereto.

As shown in FIG. 7, where the earthing clip terminal 1A of the embodiment is mounted to a board 42, as the mounting plate without the through hole, which is included in an electric device 41 of an acoustic equipment, for example, the terminal 1A may be prevented from slipping off from the board 42 by a chassis 43 mounted to the board 42 in a manner to cover it. Specifically, the chassis 43 may be provided with an engaging portion 44, such as of a projection, which may be laid at place to interfere with the stopper 20 when the terminal 1A is to be removed from the board 42. The engaging portion 44 of the chassis 43 may engage any part of the terminal 1A so long as it prevents the slip off of the terminal 1A.

It is to be noted that the invention is not limited to the foregoing modes of the embodiments. The embodiment of FIG. 4 is applicable to each of the embodiments of FIGS. 5 and 7 whereas the embodiment of FIG. 7 is applicable to the embodiment of FIG. 1. Further, other various changes and modifications may be made within the scope of the invention.

What is claimed is:

1. A snap-on type earthing clip terminal clamping a mounting plate on opposite first and second faces, thereof, comprising:

a plate-like terminal body to which an electric wire is connected;

an engaging claw which is formed by cutting and bending up a portion of the terminal body and is engaged with the mounting plate; and a primary pressure strip which is formed in an area inside of the terminal body and by cutting and bending up a portion of the terminal body exclusive of an auxiliary cantilever pressure strip with the engaging claw and which is cantilevered from the terminal body;

the mounting plate is inserted between the primary pressure strip and the terminal body and between the primary pressure strip and the auxiliary pressure strip; and the primary pressure strip includes a pressing portion which resiliently presses the first face of the inserted mounting plate for bringing the terminal body and the auxiliary pressure strip into being approximately along the second face of the mounting plate.

2. An earthing clip terminal according to claim 1, further comprising a stopper disposed at the terminal body, the stopper which abuts against an incoming edge portion of the mounting plate for preventing the edge portion from abutting against a proximal end of the primary pressure strip.

3. An earthing clip terminal according to claim 2, the stopper fits in a recess formed in the edge portion of the mounting plate.

4. An earthing clip terminal according to claim 1, the pressing portion is disposed near a distal end of the primary pressure strip;

an inclined guide surface is defined by a surface portion extending between the pressing portion and the proximal end of the primary pressure strip and is inclined relative to the terminal body; and the inclined guide surface is brought into being approximately along the first face of the mounting plate for guiding the mounting plate removed from the terminal, as positioning the engaging claw out of interference with the mounting plate.

5. An earthing clip terminal according to claim 1, the pressing portion includes an edge of a claw piece resiliently pressing the first face of the mounting plate.

6. An earthing clip terminal according to claim 1, the engaging claw is locked in a through hole penetrating through the mounting plate.

7. An earthing clip terminal according to claim 1, the engaging claw is engaged with the second face of the mounting plate.

8. A snap-on type earthing clip terminal for clamping a mounting plate on opposite first and second faces thereof, comprising:

a plate-like terminal body to which an electric wire is connected;

an engaging claw which is formed by cutting and bending up a portion of the terminal body and is engaged with the mounting plate;

a primary pressure strip which is formed in an area inside of the terminal body and by cutting and bending up a portion of the terminal body exclusive of an auxiliary cantilever pressure strip with the engaging claw and which is cantilevered from the terminal body; and a stopper which is disposed at the terminal body and abuts against an incoming edge portion of the mounting plate for preventing the edge portion from abutting against a proximal end of the primary pressure strip.

9. An interconnection structure establishing interconnection between a mounting plate and an earthing clip terminal by permitting the earthing clip terminal to clamp the mounting plate on opposite first and second faces thereof, comprising:

a terminal body to which an electric wire is connected;

an engaging claw which is formed by cutting and bending up a portion of the terminal body and is engaged with the mounting plate; and a primary pressure strip which is formed in an area inside of the terminal body and by cutting and bending up a portion of the terminal body exclusive of an auxiliary cantilever pressure strip with the locking claw and which is cantilevered from the terminal body;

the mounting plate is inserted between the primary pressure strip and the terminal body and between the primary pressure strip and the auxiliary pressure strip;

the primary pressure strip includes a pressing portion which resiliently presses the first face of the inserted mounting plate thereby bringing the terminal body and the auxiliary pressure strip into being approximately along the second face of the mounting plate; and the earthing clip terminal is prevented from slipping off from the mounting plate by a cover plate which covers the mounting plate as disposed in parallel thereto.

* * * * *